(12) United States Patent
Saito

(10) Patent No.: US 6,747,671 B1
(45) Date of Patent: Jun. 8, 2004

(54) VIDEO APPARATUS HAVING FUNCTION TO CHANGE SIZE OF IMAGE AND METHOD THEREOF

(75) Inventor: Seiji Saito, Kanagawa (JP)

(73) Assignee: Sony Corporation, Tokyo (JP)

( * ) Notice: Subject to any disclaimer, the term of this patent is extended or adjusted under 35 U.S.C. 154(b) by 254 days.

(21) Appl. No.: 09/654,851

(22) Filed: Sep. 5, 2000

(30) Foreign Application Priority Data

Sep. 6, 1999 (JP) .......................................... P11-251389

(51) Int. Cl.[7] ................................................ G09G 5/02
(52) U.S. Cl. ...................... 345/698; 345/115; 345/132; 348/173; 348/445; 348/455; 348/458; 358/183; 358/140
(58) Field of Search ................................ 345/698, 115, 345/132; 348/173, 445, 455, 458; 358/183, 140

(56) References Cited

U.S. PATENT DOCUMENTS

| | | | | |
|---|---|---|---|---|
| 5,323,235 A | * | 6/1994 | Tonomura et al. | 348/445 |
| 5,347,313 A | * | 9/1994 | Choi | 348/445 |
| 5,534,940 A | * | 7/1996 | Sato et al. | 348/556 |
| 5,537,149 A | * | 7/1996 | Teraoka et al. | 348/556 |
| 5,973,749 A | * | 10/1999 | Ishii et al. | 348/558 |
| RE36,456 E | * | 12/1999 | Kim | 348/445 |
| 6,429,894 B1 | * | 8/2002 | Hicks | 348/173 |

* cited by examiner

Primary Examiner—Regina Liang
Assistant Examiner—Jennifer T. Nguyen
(74) Attorney, Agent, or Firm—Jay H. Maioli (57) ABSTRACT

When an image is displayed on a display screen having a larger display area than a displayed image, a size of the displayed image is minutely changed cyclically in order to avoid boundary lines to be recognized when a full size image is displayed on the display screen of the display device. Direction of the size change of the displayed image is in the vertical direction or the horizontal direction. In this case additional non-image signal is added to top, bottom, left and/or right of the displayed image.

6 Claims, 8 Drawing Sheets

VIDEO APPARATUS HAVING FUNCTION TO CHANGE SIZE OF IMAGE AND METHOD THEREOF

BACKGROUND OF THE INVENTION

1. Field of the Invention

This invention relates, for example, to a video apparatus capable for forming an image area within a display screen displaying a video image having an aspect ratio of 16:9 on a display screen having an aspect ratio of 4:3 or for displaying a video image having an aspect ratio of 4:3 on a display screen having an aspect ratio of 16:9, and a video apparatus having a function of displaying characters, such are letters and symbols, by superimposing them on an image, and particularly to such video apparatus having a function to have a borderline, between a video image area and a non-video image area or a non-image part, which is generated due to deteriorated luminous characteristics of a phosphor of a display element, and characters and symbols on the display hardly recognizable.

2. Description of Related Art

A video display apparatus such as a television receiver using an existing picture tube (cathode-ray tube: CRT) or a video monitor has a display screen having an aspect ratio of 4:3 or 16:9 being a landscape monitor. As information of a video image to be displayed on the display screen, there are video information which shows a circularity 1 when displayed with the aspect ratio of 4:3 (here-in after referred to as a 4:3-image) and video information which shows the circularity 1 when displayed with the aspect ratio of 16:9 (here-in-after referred to as a 16:9-image).

Accordingly, when the video signal is displayed on the display screen having a different aspect ratio from that of the video signal, a circularity becomes other than 1. On this account, conventionally, a size of the video image is changed or a non-video image area is added to a spare space of the video signal in order to make the circularity to be 1 when the video signal is displayed on the display screen having a different aspect ratio.

Figure 6:
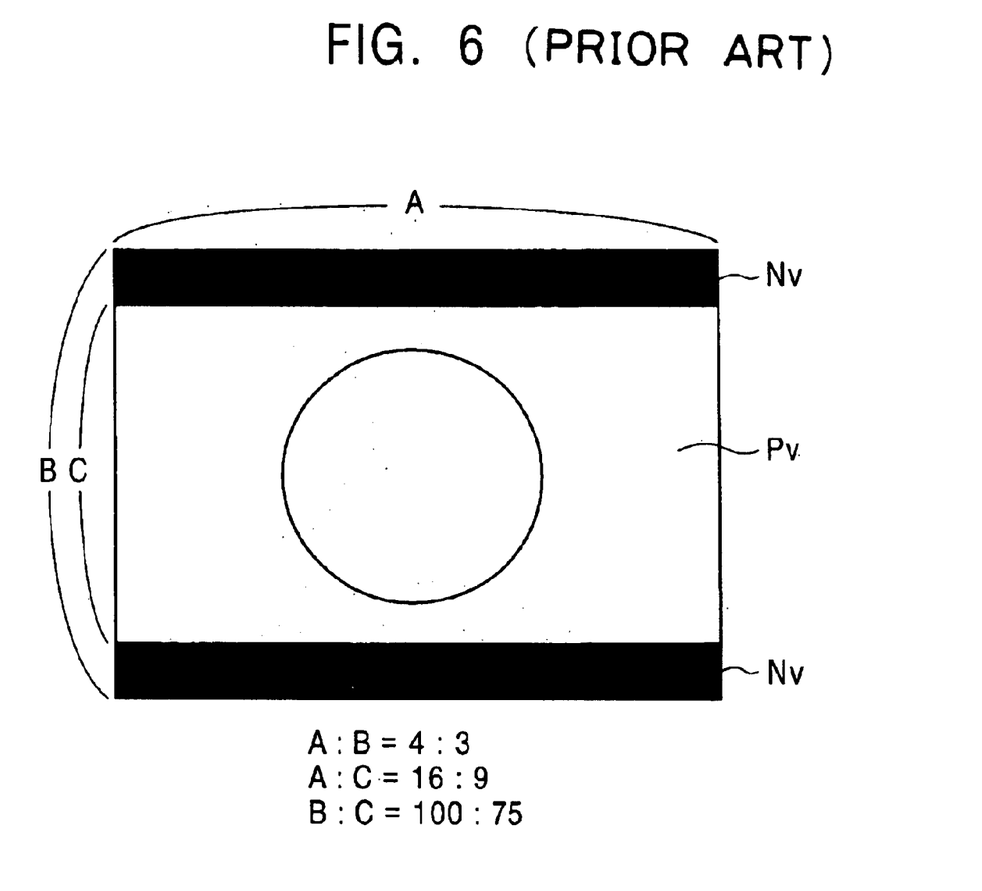
FIG. 6 is a diagram for explaining display conditions of a conventional case.

For example, when the 16:9-image is displayed on a display screen of the aspect ratio of 4:3 in a video display apparatus, only 75% of a video image area Pv is scanned in the vertical direction of the display screen by a deflected electron beam, so that the size of the displayed image is compressed in the vertical direction by 75%, as shown in FIG. 6. Thereby, the circularity in maintained to be 1 and the 16:9-image is correctly displayed.

In this case, a top part and a bottom part of the display screen where the deflected electron beam does not scan becomes a non-video image area Nv where the phosphor does not emit light.

Figure 8:
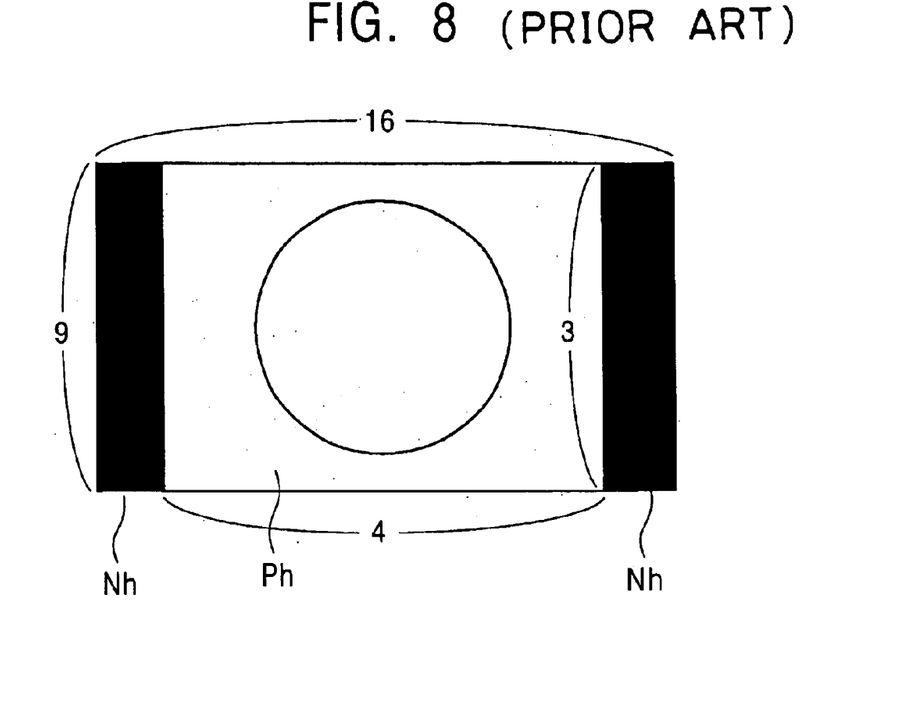
FIG. 8 is a diagram for explaining other display conditions of the conventional case.

In addition, when the 4:3-image is displayed on the display screen of the aspect ratio of 16:9 in the video display apparatus, only 75% of the video image area Ph in the horizontal direction of the display screen is scanned by the deflected electron beam, so that the size of the displayed image is compressed in the horizontal direction by 75%, as shown in FIG. 8. Thereby, the circularity is maintained to be 1 and the 4:3-image is correctly displayed.

In this case, a left edge and a right edge of the display screen where the deflected electron beam does not scan becomes a non-video image area Nh where the phosphor does not emit light.

In addition, the 16:9-image may be converted into the 4:3-image by adding a non-image part (black band) corresponding to the non-video image area Nv on top or bottom of the 16:9-image and displayed without modification of the size of the video image by the deflection, thereby the image information can be correctly displayed with circularity 1.

In addition, the 4:3-image may be converted into the 16:9-image by adding a non-image part corresponding to the non-video image area Nh on left edge and/or right edge of the 4:3-image and displayed without modification of the size of the video image by the deflection, thereby the image information can be correctly displayed with circularity 1.

Furthermore in a television receiver for receiving television broadcasting, it is broadly done to display characters such as letters and symbols indicating time information, logotypes of the broadcasting program or the like on the video image in superimposing form in order to communicate various information to a viewer.

However, when a time period for displaying video images with compressed image size as shown in FIG. 6 or FIG. 8 becomes long hours, the luminous characteristics of the phosphor of the CRT become different between the video image area Pv and the non-video image area Nv and between the video image area Ph and the non-video image area Nh. Accordingly when the display mode is changed to cancel the size compression of the displayed image, boundary lines between the video image area Pv and the non-video image area Nv and between the video image area Ph and the non-video image area Nh are recognizably left on the display screen of the CRT.

In other words, when the display situation of the CRT is considered, the phosphor of the video image area Pv of the 16:9-image emits light in accordance with the video information, but the phosphor of the non-video image area Nv does not emit light at all as shown in FIG. 6.

Generally, the luminous characteristics of the phosphor is deteriorated if the duration of emitting time of the phosphor becomes long hours, so that the brightness for the video image area Pv of the 16:9-image becomes darker as compared with the brightness of the non-video image area Nv.

When the display mode for displaying the 4:3-image on the display screen having the aspect ratio of 4:3 is selected, the brightness of the video image area Pv, where the 16:9-image is displayed on the display screen having the aspect ratio of 4:3, becomes darker as compared with the brightness of the non-video image area Nv. Furthermore, distinction is recognized in the chrominance levels due to a difference of deteriorated luminous characteristics of the phosphors.

Figure 7:
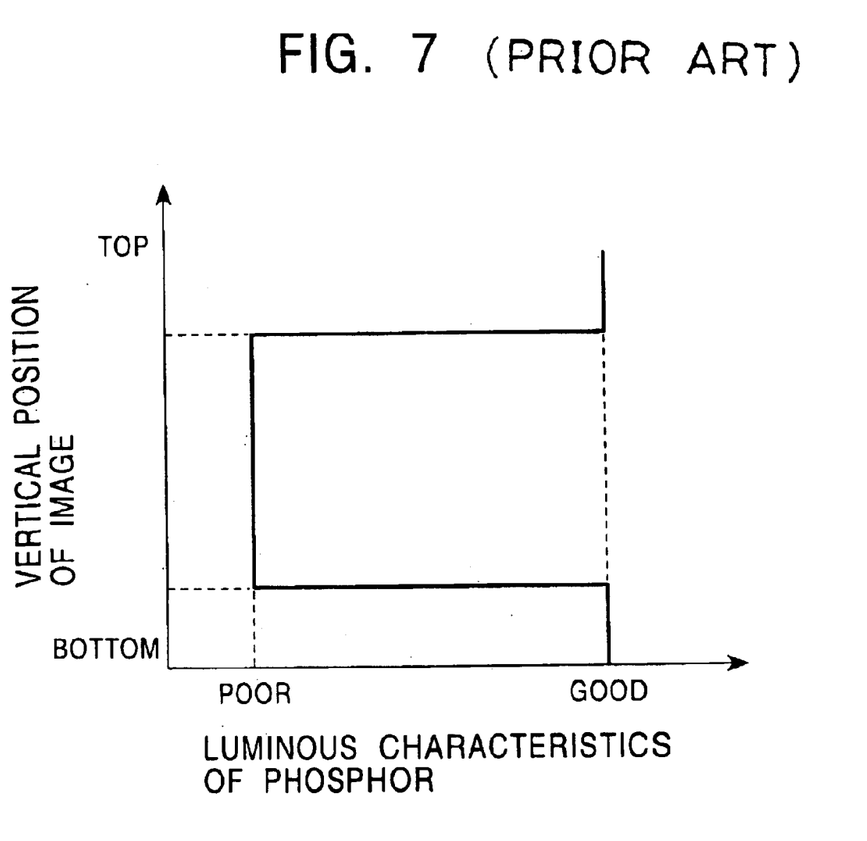
FIG. 7 is a diagram showing luminous characteristics of the phosphor in a case of FIG. 6.

Thereby, a viewer can recognize the boundary lines between the video image area Pv and the non-video image area Nv in the display image of the 16:9-image. In this case, relation between a vertical position of the video image and luminous characteristics of the phosphor is as shown in FIG. 7.

Also in a case of the mode in which the 4:3-image is displayed on the display screen of the aspect ratio of 16:9 as shown in FIG. 8, there is a problem about boundary lines between the video image area Ph and the non-video image area Nh are recognizable.

In addition, in a case where characters and symbols such as logotypes are displayed for a long time in superimposed form on the video image, as the luminous characteristics of the phosphors are different between display positions of the characters and symbols and display positions other than this display positions, so that there is such a problem that display tracks for the characters and symbols are left and recognized by a viewer even after the superimposing display situation is finished.

It is an object of the present invention in consideration of the above points to make it hard to recognize the display tracks of boundary lines between the video image area and the non-video image area caused by the difference of the luminous characteristics deterioration of the phosphor in the display device without giving a sense of discomfort to a viewer.

SUMMARY OF THE INVENTION

According to the present invention, when an image is displayed on a display screen having larger display area than the image, a size of the image on the display screen is minutely changed cyclically in order to avoid boundary lines to be recognized when a full size image is displayed on the display screen of the display device. The object of the present invention is to propose such apparatus that has a function to change a size of the image on the display and method therefore.

Namely, according to an aspect of the present invention, there is provided a video display apparatus, which comprises supply means for supplying display signals to a display device; mode control means coupled to the supply means for selecting display modes in the display device between a first display mode where an image having an aspect ratio of 4:3 is displayed on a display screen having the aspect ratio of 4:3 in the display device and a second display mode where an image having an aspect ratio of 16:9 is displayed on the display screen having the aspect ratio of 4:3 in the display device by compressing the image in a vertical direction; and size change means coupled to the supply means for changing minutely and cyclically a size of a display image displayed on the display device in the vertical direction in the second display mode.

According to the first aspect of the present invention, in a case where the second mode is selected, since the display size of the 16:9-image is changed minutely and cyclically in a vertical direction, difference in deterioration of luminous characteristics of the video image area and the non-video image area at the boundary line becomes not significant due to the slight size reduction so that it is not recognizable and does not five a sense of discomfort to a viewer.

Further, in a second aspect of the present invention, there is provided a video display apparatus, which comprises: supply means for supplying display signals to a display device; mode control means coupled to the supply means for selecting display modes in the display device between a first mode where an image having an aspect ratio of 4:3 is displayed on a display screen of the display device having an aspect ratio of 4:3 and a second mode where an image having an aspect ratio of 16:9 is displayed on the display screen of the display device with additional non-image part on top and bottom of the displayed image having an aspect ratio of 16:9; and size change means coupled to the supply means for changing minutely and cyclically a size of the image displayed on the display device in the vertical direction.

According to the second aspect of the present invention, in a case where the second mode is selected, since the display size of whole displayed image is changed minutely and cyclically in a vertical direction, difference in deterioration of luminous characteristics of the video image area of the aspect ratio of 16:9 and the non-image part at the boundary line becomes not significant due to the slight size reduction so that it is not recognizable and does not five a sense of discomfort to a viewer.

In a third aspect of the present invention, there is provided a video display apparatus, which comprises: supply means for supplying display signals to a display device; mode control means coupled to the supply means for selecting display modes in the display device between a first display mode where an image having an aspect ratio of 16:9 is displayed on a display screen having the aspect ratio of 16:9 in the display device and a second display mode where an image having an aspect ratio of 4:3 is displayed on the display screen having the aspect ratio of 16:9 of the display device by compressing the image in a horizontal direction; and size change means coupled to the supply means for changing minutely and cyclically a size of a display image displayed on the display device in the horizontal direction in the second display mode.

According to the third aspect of the present invention, in a case where the second mode is selected, since the size of display image of the aspect ratio of 4:3 is changed minutely and cyclically in a horizontal direction, difference in deterioration of luminous characteristics of the video image area and the non-video image area at the boundary line becomes not significant due to the slight size reduction so that it is not recognizable and does not five a sense of discomfort to a viewer.

A fourth aspect of the present invention provides a video display apparatus, which comprises supply means for supplying display signals to a display device; mode control means coupled to the supply means for selecting display modes in the display device between a first mode where an image having an aspect ratio of 16:9 is displayed on a display screen of the display device having an aspect ratio of 16:9 and a second mode where an image having an aspect ratio of 4:3 is displayed on the display screen having the aspect ratio of 16:9 of the display device with additional non-image part on a left edge and a right edge of an displayed image having the aspect ratio of 4:3; and size change means coupled to the supply means for changing minutely and cyclically a size of the display image displayed on the display device in a horizontal direction.

According to the fourth aspect of the present invention, in a case where the second mode is selected, since the size of whole display image is changed minutely and cyclically in a horizontal direction, difference in deterioration of luminous characteristics of the video image area of the aspect ratio of 16:9 and the non-image part at the boundary line becomes not significant due to the slight size reduction so that it is not recognizable and does not five a sense of discomfort to a viewer.

A fifth aspect of the present invention provides a video display apparatus, which comprises: character generating means for generating characters and symbols; supply means for supplying display signals to a display device for displaying an image on which the signals form the character generating means are superimposed; and size change means coupled to the supply means for changing minutely and cyclically a size of a displayed image displayed on the display device in a horizontal direction and/or a vertical direction.

According to the fifth aspect of the present invention, with regard to the image on which characters and symbols are superimposed, since the size of whole display image is changed minutely and cyclically in a vertical direction or a horizontal direction, difference in deterioration of luminous characteristics of characters and symbols becomes not significant due to the slight size reduction so that display tracks of the characters and symbols are hardly recognizable and does not five a sense of discomfort to a viewer.

The present invention is also related to a method for displaying an image, the method comprises the steps of:

determining a mode to be selected from a first mode where an image having an aspect ratio of 4:3 is displayed on a display screen having the aspect ratio of 4:3 and a second mode where an image having an aspect ratio of 16:9 is displayed on the display screen having the aspect ratio of 4:3; compressing a size of an image displayed on the display screen in a vertical direction to have the aspect ratio of 16:9 in a case where the second mode is selected; and changing minutely and cyclically a size of the image compressed to have the aspect ratio of 16:9 in the vertical direction.

Further, this invention relates to a method for displaying an image, comprising the steps of: determining a mode to be selected from a first mode where an image having an aspect ratio of 16:9 is displayed on a display screen having the aspect ratio of 16:9 and a second mode where an image having an aspect ratio of 4:3 is displayed on the display screen having the aspect ratio of 16:9; compressing a size of an image displayed on the display screen in a horizontal direction to have the aspect ratio of 4:3 in a case where the second mode is selected; and changing minutely and cyclically a size of the image compressed to have the aspect ratio of 4:3 in the horizontal direction.

In another aspect of the present invention, there is provided a method for displaying an image, in which a size of a display image is changed minutely and cyclically in a vertical direction and/or horizontal direction in a case where characters and symbols are superimposed on the display image.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Figure 1:
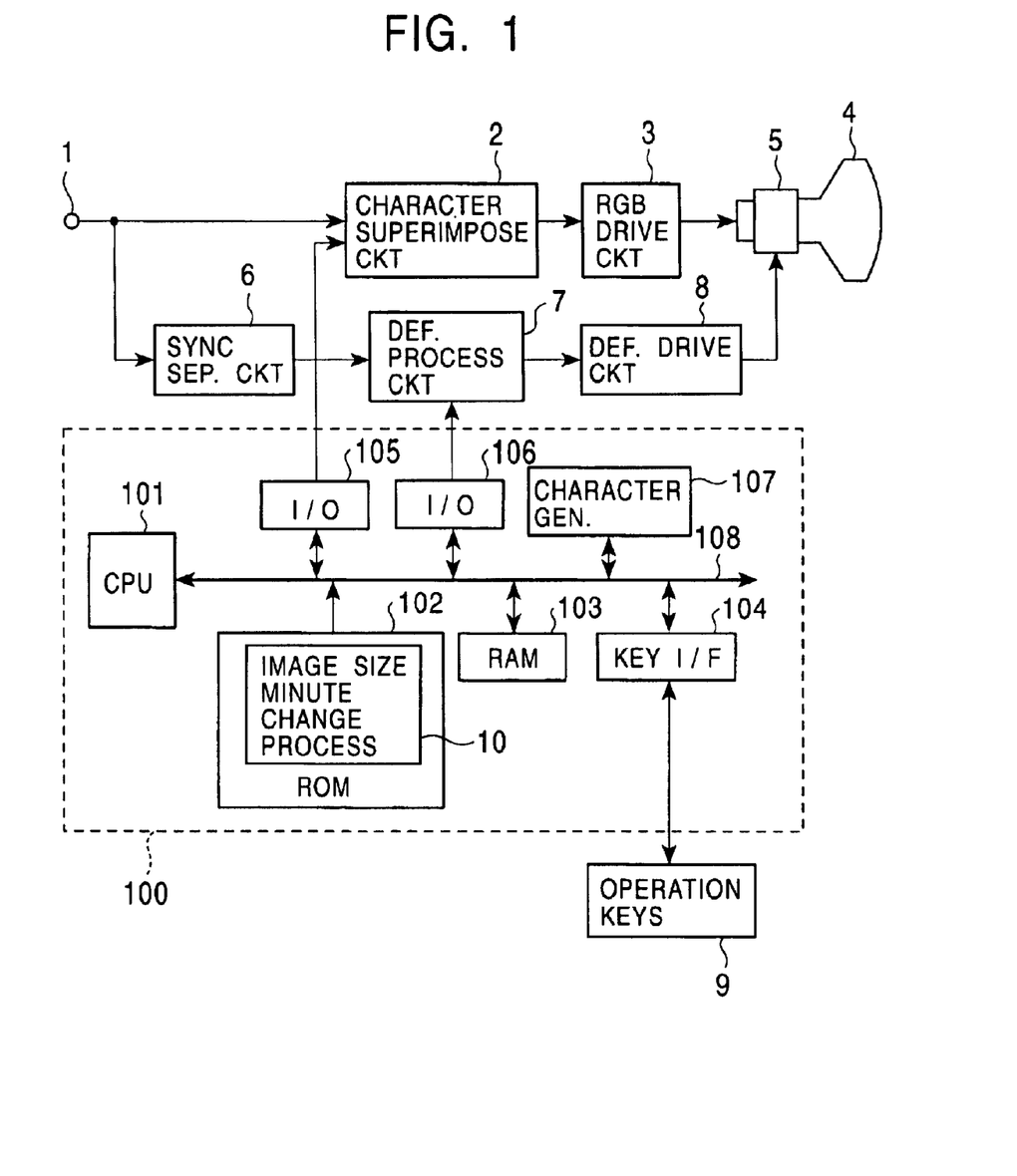
FIG. 1 is a block diagram showing one embodiment of the present invention.

One embodiment of a video display apparatus of this invention is explained with reference to the attached drawings as follows. FIG. 1 is a block diagram of constitutional embodiment of the video display apparatus, wherein a monitor receiver using a CRT (Cathode Ray Tube) is applied as an image display apparatus of this invention.

In this embodiment, the monitor receiver is equipped with a first display mode in which a 4:3-image is correctly displayed on a display screen of a CRT having an aspect ratio of 4:3 and a second display mode in which a 16:9-image is correctly displayed on the display screen of the CRT by compressing the size of the image by 75% in the vertical direction and further the monitor receiver has a function to superimpose characters and symbols on the image.

In FIG. 1, a video signal is supplied to an input terminal 1. The video signal is then supplied to a character superimposing circuit 2. This character superimposing circuit 2 superimposes characters and symbols supplied from a control circuit 100 (will be described below) on the video signal by a superimposing technique, for example, and generates the video signal with the superimposed characters and symbols. When character display signals such as characters and symbols are not supplied from the control circuit 100, the character superimposing circuit 2 supplies the video signal as it is supplied through the input terminal 1.

The video signal from the character superimposing circuit 2 is then supplied to a CRT 4 through a RGB drive circuit 3. This CRT 4 has a display screen having an aspect ratio of 4:3, a deflection yoke 5 scans the display screen of the CRT 4 using an electron beam, and a visible image is appeared on the display screen by light emitted from a phosphor screen.

The video signal supplied to the input terminal 1 is supplied to a synchronizing separator circuit 6, thereby a synchronizing signal is separated. In addition, the synchronizing signal derived from the synchronizing separator circuit 6 is supplied to a deflection processing circuit 7. The deflection processing circuit 7 receives a control signal from the control circuit 100 including a microcomputer and executes distortion correction of displaying image about a size of the image and/or a display position of the image. A deflection signal from this deflection processing circuit 7 is supplied to the deflection yoke 5 through a deflection drive circuit 8, thereby a visible image is appeared on the display screen of the CRT 4 by scanning the phosphor screen with the deflected electron beam.

The control circuit 100 includes a CPU (Central Processing Unit) 101, a ROM (Read Only Memory) 102, a RAM (Random Access Memory) 103, a key I/F (Interface) 104, two I/O (Input Output) ports 105 and 106 and a character generator 107 comprised of a ROM, for example. These CPU 101, the ROM 102, the RAM 103, the key I/F 104, two I/O ports 105 and 106 and the character generator 107 are mutually connected each other through a system bus 108. The character generator 107 may be externally connected to the control circuit 100 alternatively.

Operation keys 9 including such as a mode change key or the like are connected to the key I/F 104. The CPU 101 detects key operation done by a viewer and generates a suitable control signal corresponding to the detected key operation in accordance with a control program stored in the ROM 102. The mode change key changes the operation mode of the monitor receiver between the first display mode where the 4:3-image is displayed on the display screen having the aspect ratio of 4:3 with 100% size of the image in the horizontal and the vertical directions and the second display mode where the 16:9-image is correctly displayed on the display screen having the aspect ratio of 4:3 by compressing the size of the image by 75% in the vertical direction.

An image size minute change processing means 10 is stored in the ROM 102 as a software program. Furthermore, in a case of this embodiment, a software program for generating the character display signal to display images of characters and symbols is also stored in the ROM 102. Thus, generated character display signal is supplied to the character superimposing circuit 2 through the I/O port 105.

The I/O port 106 is connected to the deflection processing circuit 7. A mode control signal MS corresponding to the operation of the mode change key among the operation keys 9 is supplied to the deflection processing circuit 7 through the I/O port 106.

In addition, the mode control signal MS is such a control signal that controls size of the image depending on the first display mode or the second display mode. In other words, in a case of this embodiment, the control signal changes the deflection width in the vertical direction according to the display mode. Namely the deflection processing circuit 7 deflects the electron beam to scan the display screen with a vertical deflection width of 100% of the display image in the first display mode. But in the second display mode, the vertical deflection width is compressed to 75% in the vertical direction, so that the size of image is also compressed to 75% in the vertical direction. The horizontal deflection width is 100% in both display modes.

In this second display mode, a software program for compressing the size of the video image in the vertical direction by 75% is stored in the ROM 102. In addition, various values necessary for the signal processing are stored in the RAM 103.

The image size minute change processing means 10 changes, as will be described later, the size of the image having the aspect ratio of 16:9 in the vertical direction within a minute change width W (FIG. 4) of the image size at a predetermined time interval in the second display mode without giving a sense of discomfort to a viewer with regard to the circularity.

Figure 2:
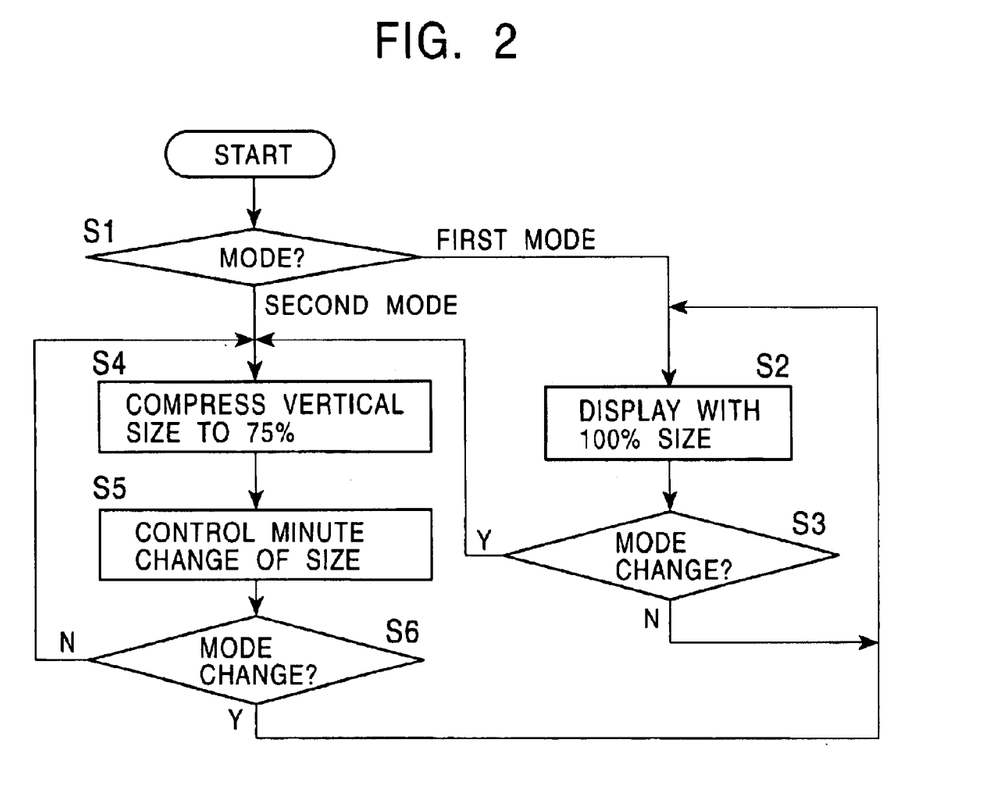
FIG. 2 is a flow chart for explaining operation of the embodiment shown in FIG. 1.

A display operation of the apparatus constructed as shown in FIG. 1 is explained next in the first display mode and in the second display mode with reference to a flow chart of FIG. 2.

At first, at step S1, it is judged which display mode is selected by the mode change key of the operation keys 9. When the first display mode is selected, the processing goes to step S2 and when the second display mode is selected, then the processing goes to step S4.

At step S2 where the first display mode is selected, as described above, the deflection processing circuit 7 supplies the deflection signal instructing to display 100% image without compressing the size of the image to the deflection drive circuit 8 in accordance with the mode control signal MS. As a result the video image having the aspect ratio of 4:3 is displayed on the display screen having the aspect ratio of 4:3. Accordingly the 4:3-image is correctly displayed with circularity 1.

The mode change is checked (at step S3) and the mode of the step S2 is maintained until the mode is changed to the second display mode. When the mode is changed to the second display mode by the mode change key, then the processing goes to step S4.

When the second display mode is selected by the mode change key of the operation keys 9, the deflection processing circuit 7 supplies the deflection signal for compressing the width of the vertical deflection by 75% to the deflection yoke 5 through the deflection drive circuit 8 as to compress the video image size by 75% in the vertical direction in accordance with the mode control signal MS, at step S4. Then the processing goes to step S5 where minute change control for the size of the image is executed.

The mode change is checked (at step S6), and the minute change control for the size of the video image at step S5 is continued until the mode is changed to the first display mode. And when the mode is changed to the first display mode by the mode change key, the processing goes to step S2.

As a result, the video image having the aspect ratio of 16:9 is displayed on the display screen having the aspect ratio of 4:3 including the non-video image area Nv where the electron beam does not scan on the top and bottom of the display screen. Accordingly the 16:9-image is correctly displayed with the circularity 1.

And the size of the video image of 16:9-image in the video image area Pv is changed minutely in the vertical direction, thereby the boundary lines between the video image area Pv and the non-video image area Nv are dispersed within the video image minute change width W. Accordingly it is hard to recognize the boundary lines even when the second display mode is changed to the first display mode.

Figure 3:
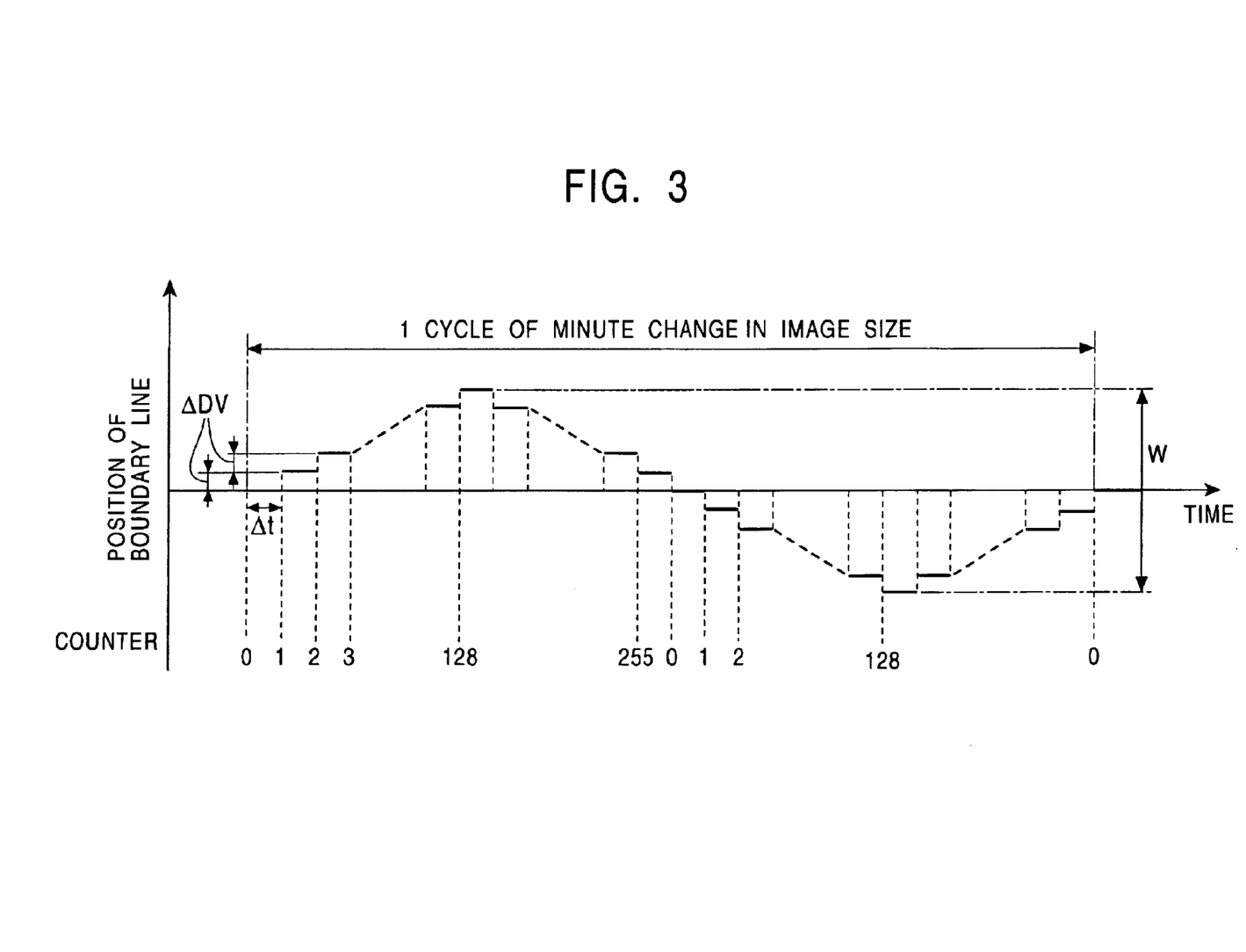
FIG. 3 is a time chart for explaining operation of the embodiment shown in FIG. 1.

FIG. 3 is a diagram for explaining one embodiment of this image size minute change processing. In this embodiment, the size of the video image compressed by 75% in the vertical direction is changed with a predetermined minute change value at a predetermined time interval using an 8-bit counter. In other words in this minute change processing as shown in FIG. 3, positions of the boundary lines between the video image area Pv and the non-video image area Nv are changed by the minute change width W.

In FIG. 3, it is shown the situation of the minute change of the boundary lines between the video image area Pv and the non-video image area Nv. At first the size of the image is gradually widened minutely by a minute change value $\ddot{A}Dv$ with 128 steps at every unit time $\ddot{A}t$, then is narrowed minutely by the minute change value $\ddot{A}Dv$ with 128 steps at every unit time $\ddot{A}t$ as to get the original 75% image. Thereafter, the size of the image is gradually narrowed minutely by the minute change value $\ddot{A}Dv$ with 128 steps at every unit time $\ddot{A}t$, then is widened minutely by the minute change value $\ddot{A}Dv$ with 128 steps at every unit time $\ddot{A}t$ as to get the original 75% image. This change cycle is repeated.

Namely, the 8-bit counter counts a clock having a duration corresponding to the unit time $\ddot{A}t$ (equivalent to a time for maintaining the same size of the video image) from a count value "0". And when the count value becomes "128", then the direction of the minute change of the size of the video image is changed.

The center position of the size of the video image minute change width W is minutely changed in the case of the image size of 75% within the width W by the minute change value $\ddot{A}Dv$. Accordingly in this case, the minute change value $\ddot{A}Dv$ at every unit time $\ddot{A}t$ is expressed by a next formula.

$$\ddot{A}Dv = W/256$$

For example, suppose the length B of the display screen in the vertical direction is 1000 mm and the size of the video image is changed by ±10 mm at maximum (namely the video image minute change width W is 20 mm), then the minute change value $\ddot{A}Dv$ becomes 0.078 mm. If the $\ddot{A}t$=15 seconds, then the size of the video image in the vertical direction is changed by the minute change value $\ddot{A}Dv$=0.078 mm by the counter and gets back to the original size (75%) of the image at a cycle of every 64 minutes.

Figure 5:
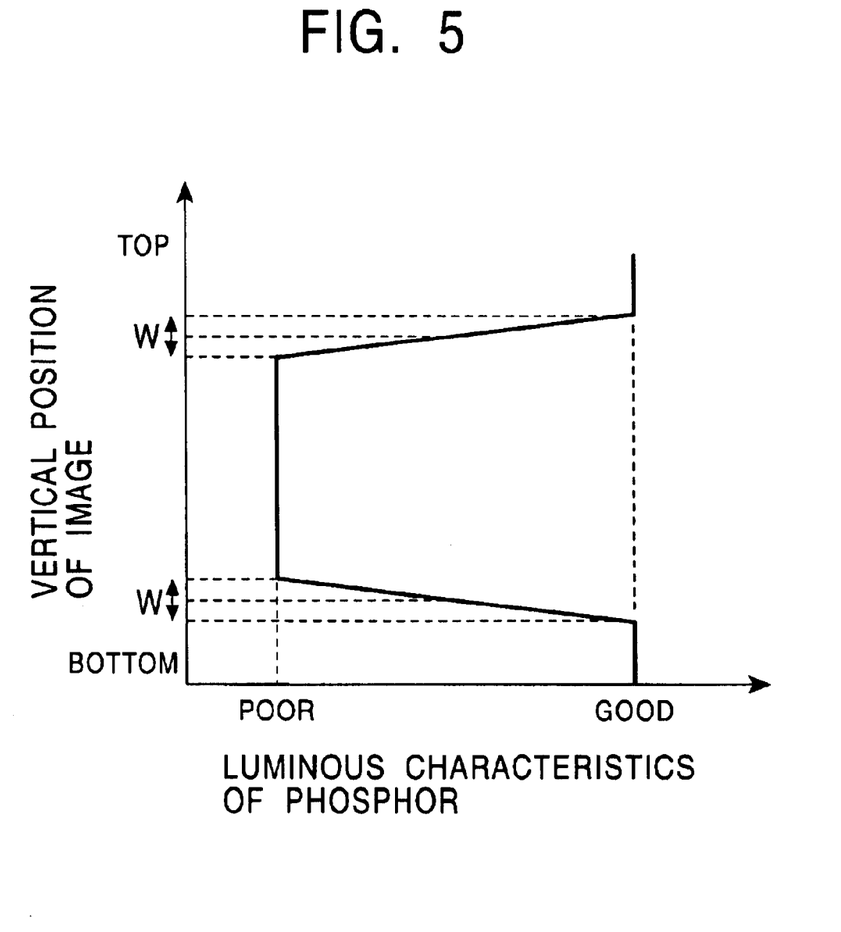
FIG. 5 is a diagram showing luminous characteristics of a phosphor in a case of FIG. 4.

By this, position of the boundary lines between the video image area Pv and the non-video image area Nv is displaced with time, and the luminous characteristics deterioration location of the phosphor disperses. Accordingly, it is hard to recognize the boundary lines of the video image area Pv and the non-video image area Nv even if the display image is changed from the video image having the aspect ratio of 16:9 to the video image having the aspect ratio of 4:3. A relationship between a vertical position of the video image and the luminous characteristics of the phosphor is shown in FIG. 5.

In other words, compared with the luminous characteristics of conventional example as shown in FIG. 7, the luminous characteristics deterioration location of the phosphor is dispersed within an extent of the width W. On this account, the boundary lines between the video image area Pv and the non-video image area Nv are hard to be detected In this case, the circularity of the 16:9-image becomes about 0.99 to 1.01 in accordance with the change of the size of the image in the vertical direction, but this does not give a sense of discomfort to a viewer. Further the change on the size of the image gives little color dislocation of the RGB as compared with the conventional case where the position of the image is changed.

Figure 4:
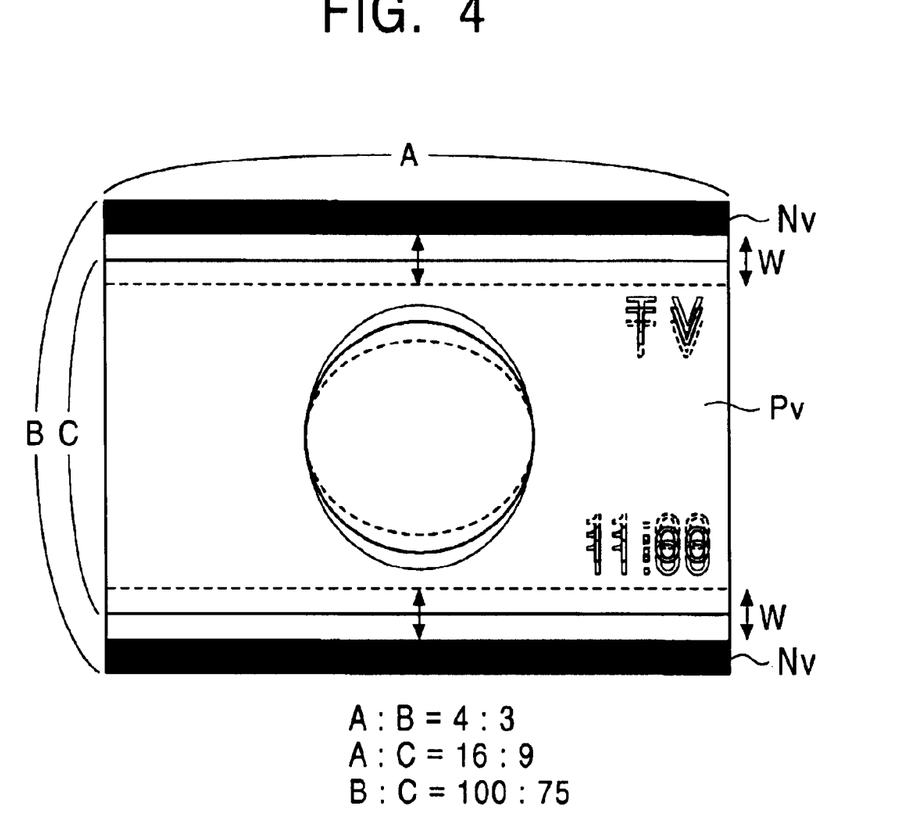
FIG. 4 is a diagram for explaining display conditions of the embodiment shown in FIG. 1.

In addition, the display positions of the tracks of the characters and symbols superimposed on the video signal by changing the size of the image as shown in FIG. 4, such tracks become hard to recognize when the display of such characters and symbols finishes.

In the case of the embodiment as stated above, the size of the video image is changed minutely in the vertical direction only in the second display mode, but the size of the video image is preferably changed even in the first display mode in order to solve the problem for the display tracks of the characters and symbols when these are displayed.

In that case, the size of the video image is changed only in the vertical direction in the second display mode, but in order to prevent display tracks of the characters and symbols from being detected, it is more effective to change the size of the video image simultaneously both in the vertical direction and in the horizontal direction than to change the size of the video image in either one of vertical direction or horizontal direction. Thereby, in the first display mode, when the characters and symbols are superimposed on the video image, the size of the video image is preferably changed simultaneously in the both vertical direction and horizontal direction.

The above-mentioned embodiment is the case where the video image having the aspect ratio of 16:9 is displayed on the display screen having the aspect ratio of 4:3 of the video apparatus by compressing the size of the image by 75%, so that the size of the image in the vertical direction is changed minutely in the second mode, but the present invention may be also applied to a case where the video image having the aspect ratio of 4:3 is displayed on the display screen having the aspect ratio of 16:9 of the video apparatus by compressing the size of the image by 75% in the horizontal direction.

Figure 9:
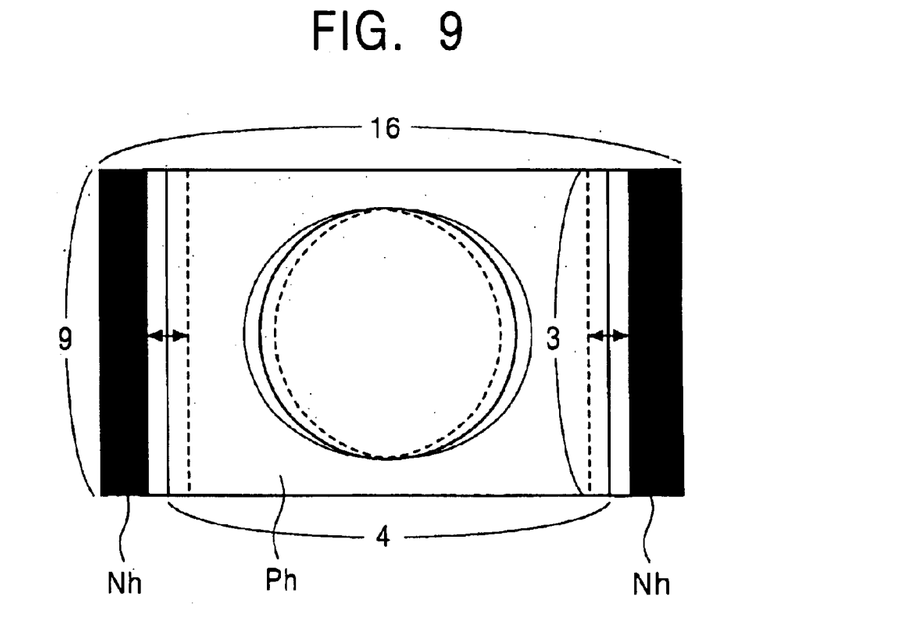
FIG. 9 is a diagram for explaining display conditions of another embodiment of the present invention.

In other words, in that case, a mode where the video image having the aspect ratio of 16:9 is displayed on the display screen having the aspect ratio of 16:9 is defined as the first display mode and a mode where the video image having the aspect ratio of 4:3 is displayed on the display screen having the aspect ratio of 16:9 by compressing the size of the image by 75% in the horizontal direction is defined as the second display mode, and, in the second display mode, the size of the image compressed by 75% in the horizontal direction is changed minutely as shown in FIG. 9.

Thereby the boundary lines between the video image area Ph and the non-video image area Nh is displaced with time, the luminous characteristics deterioration location of the phosphor disperses, and the boundary lines are hard to be detected. In this case, in the first display mode, in order to effectively avoid the display track problem in the character display, the size of the video image is better to be simultaneously changed in both vertical direction and horizontal direction.

In addition, when the 4:3-image formed by adding non-image part at top or bottom of the 16:9-image is displayed on the display screen having the aspect ratio of 4:3 as the second display mode, the size of the video image of the 4:3-image is changed in the vertical direction, thereby the boundary lines between the video image area and the non-video image area is hard to be detected.

Similarly, when the 16:9-image formed by adding non-image part at left or right of the 4:3-image is displayed on the display screen having the aspect ratio of 16:9 as the second display mode, the size of the video image of the 16:9-image is changed in the horizontal direction, thereby the boundary lines between the video image area and the non-video image area is hard to be detected.

In the explanation of the above-mentioned embodiment, a viewer changes the mode between the first display mode and the second display mode by the operation keys 9, but if the display mode signal containing information on aspect ratio of the image is superimposed on the input video signal, the display mode is automatically selected by detecting the mode signal out of the input video signal to either the first display mode or the second display mode.

The above embodiment is described in the case of the monitor receiver, but this invention is also applicable to a television receiver.

In addition, as a display device, it is not limited to a CRT (Cathode Ray Tube), but it is applicable to all types of display device which have problems at boundary lines between the video image area and the no video image area or the non-video image part.

Furthermore, not only the case where the 4:3-image is displayed on the display screen having the aspect ratio of 16:9 or the case where the 16:9-image is displayed on the display screen having the aspect ratio of 4:3 as to make the circularity to be 1, but also the present invention is applied to all types of the video apparatus that has a display mode for displaying the video image with compressed image size in the vertical direction or in the horizontal direction.

In addition, with reference to the problem about the display traces of the characters and symbols, the present invention can be applied to a video apparatus that has only the first display mode where the aspect ratio of the image is as same as the aspect ratio of the display screen of the display.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A video display apparatus, comprising:
supply means for supplying display signals to a display device;
mode control means coupled to said supply means for selecting a display mode in said display device from a first display mode where a first image having an aspect ratio of 4:3 is displayed on a display screen having an aspect ratio of 4:3 in said display device and a second display mode of where a second image having an aspect ratio of 16:9 is displayed on said display screen having the aspect ratio of 4:3 in the display device by forming top and bottom non-image areas so that said 16:9 aspect ratio of said second image is maintained and said second image is displayed with a circularity of 1; and size change means coupled to said supply means for cyclically and gradually widening and gradually narrowing minutely by a minute change value, at a predetermined time interval, a size of said second display image displayed on said display device in said vertical direction in the second display mode so that said circularity of said second image is maintained between 0.99 and 1.01.

2. A video display apparatus, comprising:

supply means for supplying display signals to a display device;

mode control means coupled to said supply means for selecting display mode in said display device from a first display mode where a first image having an aspect ratio of 16:9 is displayed on a display screen having an aspect ratio of 16:9 in said display device and a second display mode where a second image having an aspect ratio of 4:3 is displayed on said display screen having the aspect ratio of 16:9 in said display device by forming left and right non-image areas so that said 4:3 aspect ratio of said second image is maintained and said second image is displayed with a circularity of 1; and size change means coupled to said supply means for cyclically and gradually widening and gradually narrowing minutely by a minute change value, at a predetermined time interval, a size of said second display image displayed on said display device in a horizontal direction in said second display mode so that said circularity of said second image is maintained between 0.99 and 1.01.

3. The image display apparatus according to claim 1, further comprising character generating means for generating characters and symbols, wherein said supply means for supplying said display signals to said display device superimposes said characters and symbols from said character generating means.

4. A method for displaying an image, comprising the steps of:

determining a mode to be selected from a first mode where a first image having an aspect ratio of 4:3 is displayed on a display screen having an aspect ratio of 4:3 and a second mode where a second image having an aspect ratio of 16:9 is displayed on said display screen having the aspect ratio of 4:3 by forming top and bottom non-image areas so that said 16:9 aspect ratio of said second image is maintained and said second image is displayed with a circularity of 1; and cyclically and gradually widening and gradually narrowing minutely by a minute change value, at a predetermined time interval, a size of said second display image displayed on said display device in a vertical direction so that said circularity of said second image is maintained between 0.99 and 1.01.

5. A method for displaying an image, comprising the steps of:

determining a mode to be selected from a first mode where a first image having an aspect ratio of 16:9 is displayed on a display screen having an aspect ratio of 16:9 and a second mode where a second image having an aspect ratio of 4:3 is displayed on said display screen having the aspect ratio of 16:9 by forming top and bottom non-image areas so that said 16:9 aspect ratio of said second image is maintained said second image is displayed with a circularity 1; and cyclically and gradually narrowing minutely by a minute change value, at a predetermined time interval, a size of said second display image displayed on said display device in a horizontal direction so that said circularity of said second image is maintained between 0.99 and 1.01.

6. A method for displaying an image according to claim 5, wherein characters and symbols are superimposed on said image being displayed.

* * * * *